(12) United States Patent
Deliwala et al.

(10) Patent No.: US 8,153,948 B1
(45) Date of Patent: Apr. 10, 2012

(54) SYSTEMS FOR IMAGE ACQUISITION

(75) Inventors: Shrenik Deliwala, Andover, MA (US);
Allen M. Flusberg, Newton, MA (US)

(73) Assignee: Science Research Laboratory, Inc., Somerville, MA (US)

( * ) Notice: Subject to any disclaimer, the term of this patent is extended or adjusted under 35 U.S.C. 154(b) by 0 days.

(21) Appl. No.: 12/848,608

(22) Filed: Aug. 2, 2010

Related U.S. Application Data

(60) Division of application No. 12/062,809, filed on Apr. 4, 2008, now Pat. No. 7,767,951, which is a continuation-in-part of application No. 11/410,812, filed on Apr. 25, 2006, now Pat. No. 7,491,922.

(60) Provisional application No. 60/910,030, filed on Apr. 4, 2007, provisional application No. 60/674,419, filed on Apr. 25, 2005.

(51) Int. Cl.
*G02F 1/01* (2006.01)

(52) U.S. Cl. ..................... 250/208.1; 250/330

(58) Field of Classification Search ............... 250/208.1, 250/225, 330–332, 338.1, 339.05; 356/369, 356/453, 454, 456
See application file for complete search history.

(56) References Cited

U.S. PATENT DOCUMENTS

| | | |
|---|---|---|
| 4,275,302 A | 6/1981 | Imbert et al. |
| 4,959,546 A | 9/1990 | Bly |
| 5,072,120 A | 12/1991 | Siewick |
| 5,365,065 A | 11/1994 | Power |
| 6,067,155 A | 5/2000 | Ringlien |
| 6,124,593 A | 9/2000 | Bly et al. |
| 6,715,885 B2 | 4/2004 | Hirose et al. |
| 7,491,922 B1 | 2/2009 | Deliwala et al. |
| 7,767,951 B1 * | 8/2010 | Deliwala et al. ........... 250/208.1 |
| 2005/0082480 A1 | 4/2005 | Wagner et al. |
| 2005/0190206 A1 | 9/2005 | Lang et al. |

* cited by examiner

*Primary Examiner* — Kevin Pyo
(74) *Attorney, Agent, or Firm* — Burns & Levinson, LLP; Jerry Cohen, Esq.; Orlando Lopez, Esq.

(57) ABSTRACT

Image acquisition systems utilizing a pixilated transducer.

18 Claims, 17 Drawing Sheets

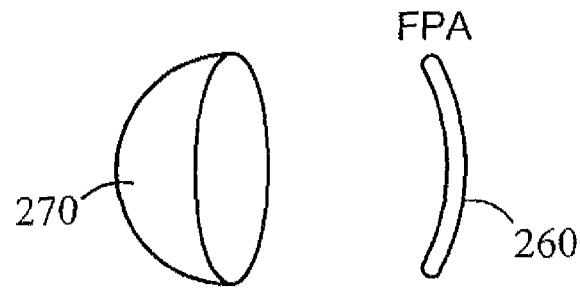
FIG. 5  Uncorrected for Curvature of Field
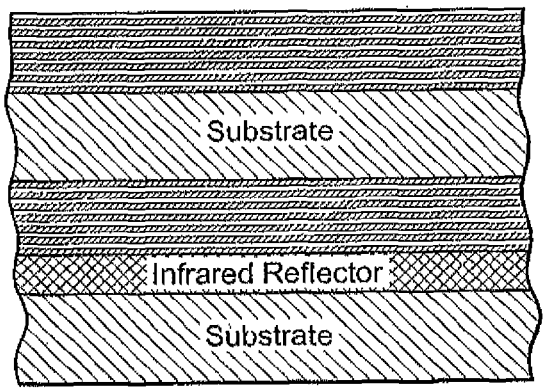
FIG. 6a
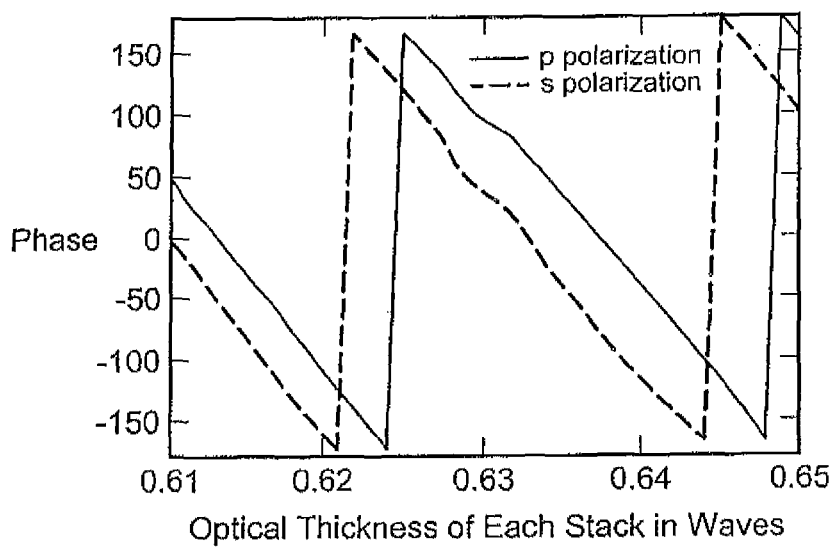
FIG. 6b

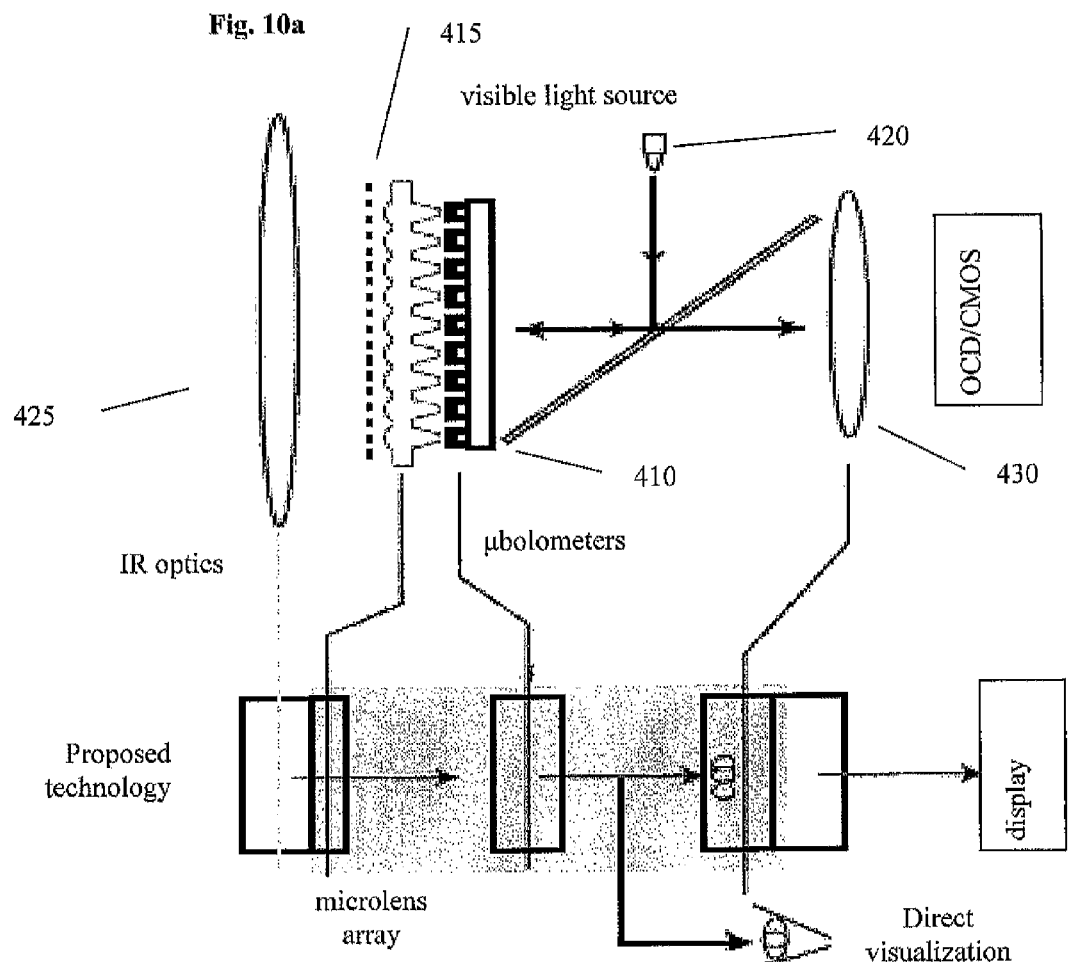

SYSTEMS FOR IMAGE ACQUISITION

CROSS REFERENCE TO RELATED APPLICATIONS

This application is a divisional of co-pending U.S. patent application Ser. No. 12/062,809, filed Apr. 4, 2008, entitled SYSTEMS AND METHODS FOR IMAGE ACQUISITION, which in turn claims priority of U.S. Provisional Application Ser. No. 60/910,030, entitled SYSTEM AND METHODS FOR IMAGE ACQUISITION, filed on Apr. 4, 2007, and which is a continuation-in-part of U.S. patent application Ser. No. 11/410,812, entitled SYSTEMS AND METHODS FOR IMAGE ACQUISITION, filed Apr. 25, 2006, which in turn claims priority of U.S. Provisional Application Ser. No. 60/674,419 filed on Apr. 25, 2005, all of which are herein incorporated by reference in their entirety for all purposes.

BACKGROUND

These teachings relate generally to image acquisition methods and systems.

Image acquisition systems are used in a variety of applications over a number of frequency ranges. In the infrared, for example, commercial applications include, but are not limited to, image analysis, condition monitoring, process control, R&D and nondestructive testing. Government applications include public safety, search and rescue, disaster response, customs and border patrol, interdiction and defense. The infrared imaging market has grown at a double-digit pace and in 2004 exceeded $1 billion. However, infrared cameras are still sold at a high price. The availability of a lower cost infrared imaging device would greatly expand applications beyond current applications and fuel a faster growth of the market. Similar comments apply to imaging devices for electromagnetic radiation in other frequency ranges.

Therefore, there is a need to provide a low-cost image acquisition system.

There is also a need to provide a low-cost image acquisition device that does not require cooling.

BRIEF SUMMARY

In one embodiment, the image acquisition system of these teachings includes a pixelated optical transducer capable of absorbing electromagnetic radiation in a first range of wavelengths, the electromagnetic radiation being received from an input source of electromagnetic radiation, another source of electromagnetic radiation in a second range of wavelengths, where the pixelated optical transducer is also capable of causing, when the electromagnetic radiation from the other source interacts with the pixelated optical transducer after absorption of a portion the electromagnetic radiation from the input source, a variation in phase of electromagnetic radiation in the second range of wavelengths emanating from the optical transducer, an optical system capable of receiving a portion of the electromagnetic radiation emanating from the other source and the portion of the electromagnetic radiation in the second range of wavelengths emanating from the optical transducer, a detector, where the optical system is also capable of imaging an interference pattern onto the detector, the interference pattern being obtained from the portion of the electromagnetic radiation emanating from the other source and the portion of the electromagnetic radiation in the second range of wavelengths emanating from the optical transducer, and an analysis component capable of obtaining intensity information from the interference pattern. The obtained intensity information provides an image of the input source.

Methods for utilizing the system of these teachings are also disclosed.

For a better understanding of the present teachings, together with other and further needs thereof, reference is made to the accompanying drawings and detailed description and its scope will be pointed out in the appended claims.

BRIEF DESCRIPTION OF THE DRAWING

FIG. 1b is a graphical schematic representation of results from the embodiment of FIG. 1a;

FIG. 5 depicts another embodiment of a component of the system of these teachings;

FIG. 6a depicts an embodiment of another component of the system of these teachings;

FIG. 6b is a graphical schematic representation of the behavior of yet another component of the system of these teachings;

FIGS. 10a, 10b are graphical schematic representations of yet a further embodiment of the system of these teachings;

DETAILED DESCRIPTION

The term "optical" as used herein refers to systems, objects or matters related to electromagnetic radiation. The term "light" as used herein refers to electromagnetic radiation including, but not limited to, the visible range of frequencies.

In one embodiment, the image acquisition system of these teachings includes a pixelated optical transducer capable of absorbing electromagnetic radiation in a first range of wavelengths, the electromagnetic radiation being received from an input source of electromagnetic radiation, another source of electromagnetic radiation in a second range of wavelengths, where the pixelated optical transducer is also capable of causing, when the electromagnetic radiation from the other source interacts with the pixelated optical transducer after absorption of a portion the electromagnetic radiation from the input source, a variation in phase of electromagnetic radiation in the second range of wavelengths emanating from the optical transducer, an optical system capable of receiving a portion of the electromagnetic radiation emanating from the other source and the portion of the electromagnetic radiation in the second range of wavelengths emanating from the optical transducer, a detector, where the optical system is also capable of imaging an interference pattern on to the detector, the interference pattern being obtained from the portion of the electromagnetic radiation emanating from the other source and the portion of the electromagnetic radiation in the second range of wavelengths emanating from the optical transducer, and an analysis component capable of obtaining intensity information from the interference pattern. The obtained intensity information provides an image of the input source. Since sensing the variation in phase can be accomplished with a substantially low power source of radiation in the second range of wavelengths, the image acquisition system of these teachings requires substantially low power in order to operate.

Figure 1B:
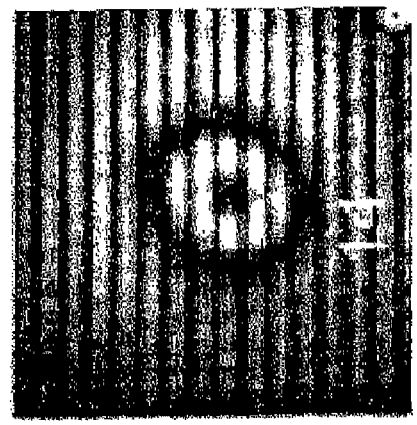
Figure 1A:
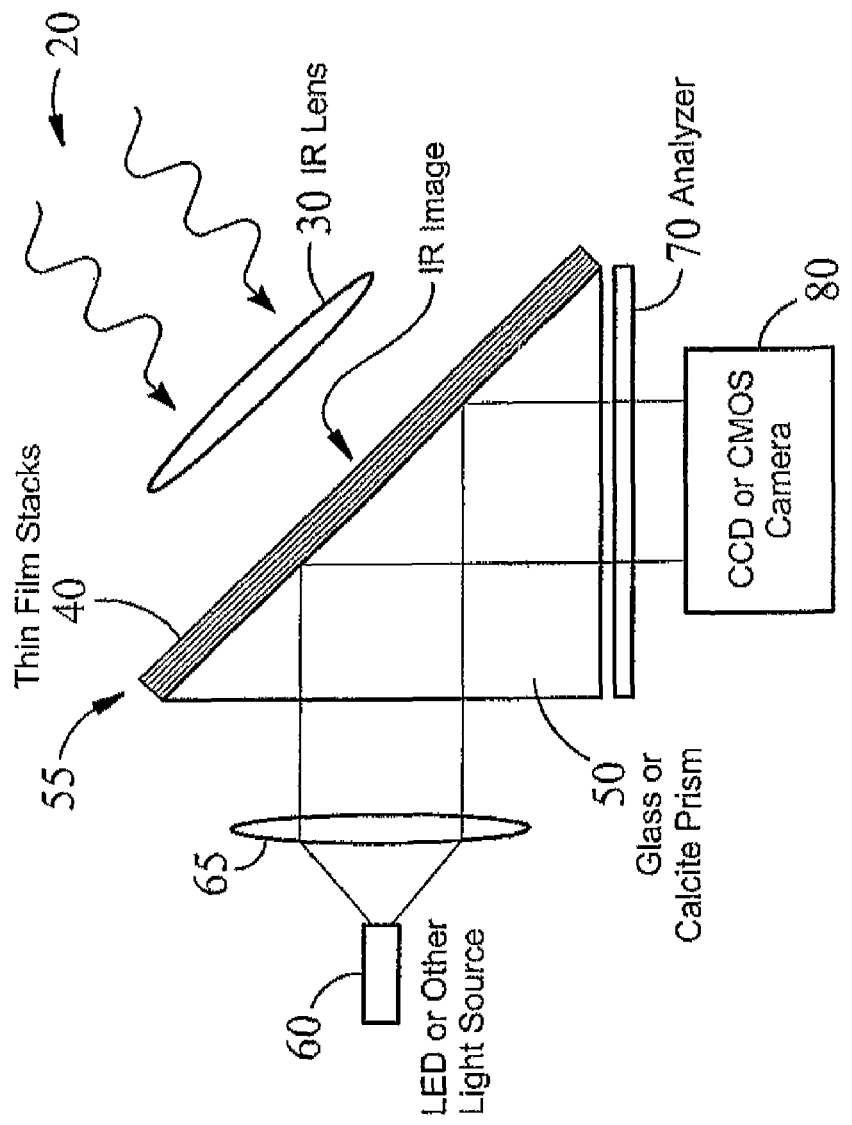
FIG. 1a is a graphical schematic representation of an embodiment of the system of these teachings.

An embodiment of the image acquisition system of these teachings is shown in FIG. 1a. Referring to FIG. 1a, in the pixelated optical transducer 55 shown therein, a film stack 40 is laid on the hypotenuse of a glass prism 50. An input source 20 of electromagnetic radiation in a first range of wavelengths is imaged by an optical system 30 onto a surface of the film stack 40. The effective optical properties of the film stack 40 are altered by heating due to absorbed radiation. Another source 60 of electromagnetic radiation in a second range of wavelengths is imaged onto another surface of the film stack 40 by another optical system including optical elements 65 and 70. The altered effective optical properties of the film stack 40 in turn alter the phase of the electromagnetic radiation in the second range of wavelengths reflected form the other surface of the film stack 40. In one embodiment, the first range of wavelengths is in the infrared range and the second range of wavelengths is in the visible range. The infrared image information is impressed onto a visible "readout" beam as localized phase changes.

In the detailed embodiments described herein below the first range of frequencies is in the infrared range. However, it should be noted that these teachings are not limited only to these exemplary embodiments. Any other range of frequencies can be used for the range of frequencies of the input source.

The phase change is converted to intensity by using interferometry or ellipsometry. The method shown in the FIG. 1a uses ellipsometry to convert the local change in phase to an image by analyzing the polarization state of the reflected light. In one embodiment, linearly polarized light undergoes total internal reflection at an interface whose properties are altered by the absorbed infrared radiation. (In a total internal reflection (TIR) geometry, the amplitude of the reflected light always remains at unity which considerably simplifies the interpretation of the image.) The local polarization state of light is altered in proportion to local heating. FIG. 1b shows data obtained using the embodiment of FIG. 1a to image a pinhole irradiated by a $CO_2$ laser. From the image, we see that the $CO_2$ laser has caused a phase change of almost 180°, evidenced by the appearance of dark and bright rings. It is estimated that the substrate temperature had changed by a maximum 10 K from the $CO_2$ laser. The image shown in FIG. 1b was captured by a home video camera. If the image is captured by a CCD camera 80 with a 14 bit dynamic range, the phase change of 0.1° or a temperature change in the substrate of 0.005 K can be resolved.

While not desiring to be bound by theory, a theoretical explanation of how the polarization of the totally internally reflected light can be changed by controlling the characteristics of the totally internally reflecting surfaces. The theory presented herein below shows that appropriate thin film stacks can be made sensitive to the changes in the temperature which will lead to the changes in the optical parameters of the film at a second range (visible) of wavelengths. Herein below, films (stacks) are characterized by their optical thickness. Changes in the optical thickness due to pressure, temperature, etc. lead to changes in the phase of reflected electromagnetic radiation.

In the calculations that follow, the performance of the embodiment of the system of these teachings depends on the phase shift introduced on TIR for the two polarizations of electric field. The polarization perpendicular to the plane of incidence is denoted by s and the polarization parallel to the plane of incidence is denoted by p. The phase shifts on reflection $\phi_s$ and $\phi_p$ produced on reflection of the two polarizations are given by $$\eta = (\sqrt{n^2 \sin\theta_i^2 - 1})/\cos\theta_i$$

$$\phi_p = 2\tan^{-1}(n\eta)$$

$$\phi_s = 2\tan^{-1}(\eta/n)$$

These Equations follow from the conventional Fresnel relations. Here n is the relative refractive index of the denser medium and θ is the angle of incidence in the denser medium. Note that for any polarization device (quarter wave plate, phase modulator etc.) it is the phase shift between the two polarizations, $\phi = \phi_p - \phi_s$, that is important. By applying thin films to the TIR surface, the phase shift between the p and polarization can be tuned to almost any desired value. For a thin film coating, the phase changes need to be computed numerically.

When TIR is utilized in an embodiment of the system of these teachings, it is should be noted that the changes in the phase for the s and p polarizations are different when the thin film coatings are heated. Thus, local heating in the thin film can be measured by measuring the phase shift between the two polarizations as shown in FIG. 1a.

In the above teachings, an exemplary embodiment of a mapping of various bands (sub-ranges) in the first range of frequencies into various different colors (also referred to as pseudo-color or sub-ranges in the visible). In at least some of the embodiments presented hereinabove, sub-ranges in the first range of frequencies (the infrared range in one embodiment) are mapped into pseudo-color or sub-ranges in the visible.

The conventional matrix methods are utilized to model these coatings (thin film stacks) and determine the coatings that may show large phase changes on heating. Effects of temperature change on the optical parameters via absorption of infrared radiation and thermal diffusion can be included. As previously stated, in the TIR geometry, all coatings will have reflectivity of substantially unity, thus simplifying interpretation of the image. In general, the coatings that show rapid variation in color when seen from different angles will obviously show rapid variation in phase when heated. This follows very generally from the thin film interference. The relevant optical parameter for the film is $$\varepsilon = \frac{2\pi}{\lambda} nt\cos\theta$$

where t is the thickness of the film, n its refractive index and θ is the angle of incidence in the film. ε determines the property of the film. From the above equation, it follows that changes in the angle of incidence are equivalent to changes in the product nt. The product nt changes when the film is heated.

Figure 2:
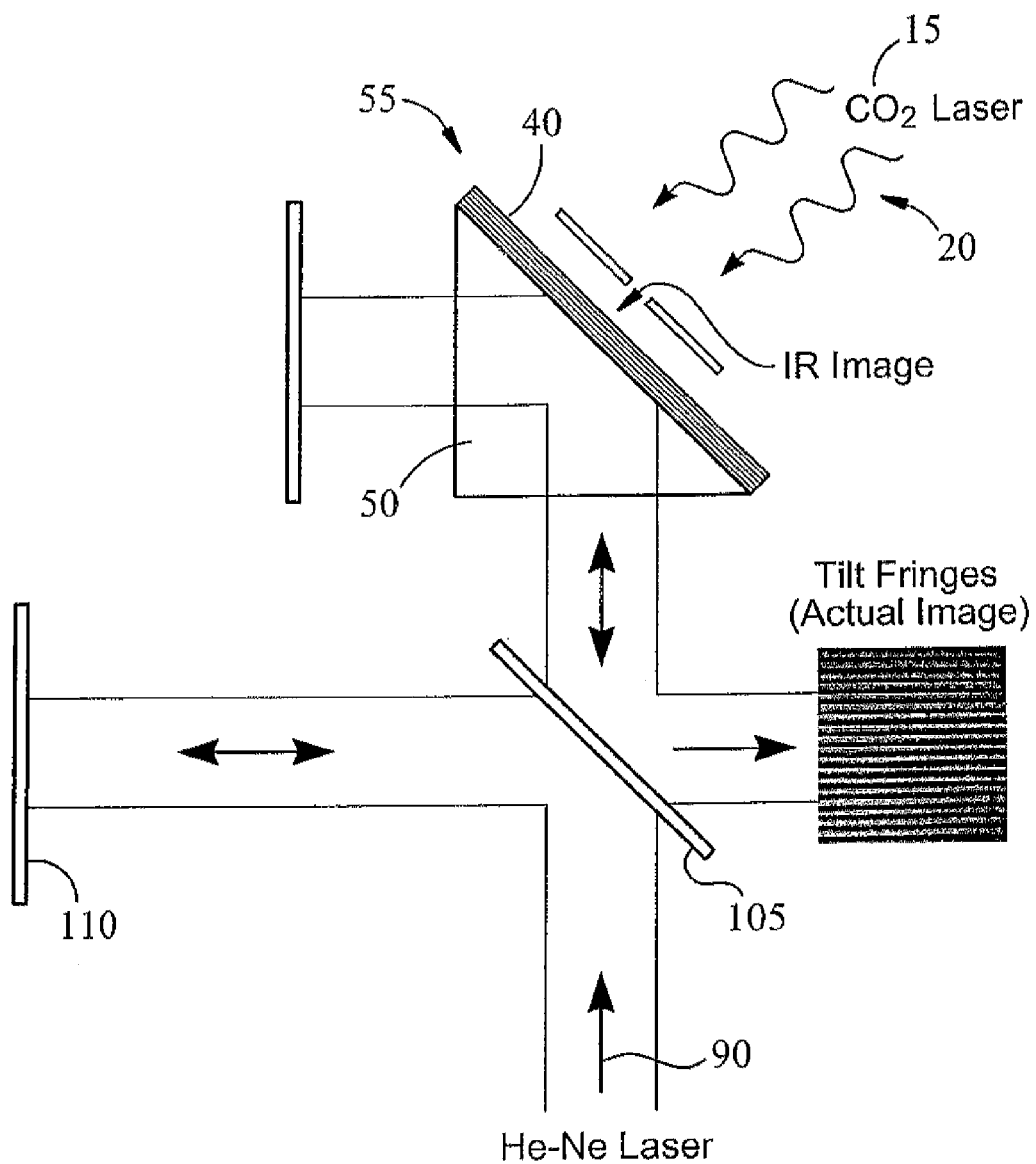
FIG. 2 is a graphical schematic representation of another embodiment of the system of these teachings.
Figure 3A:
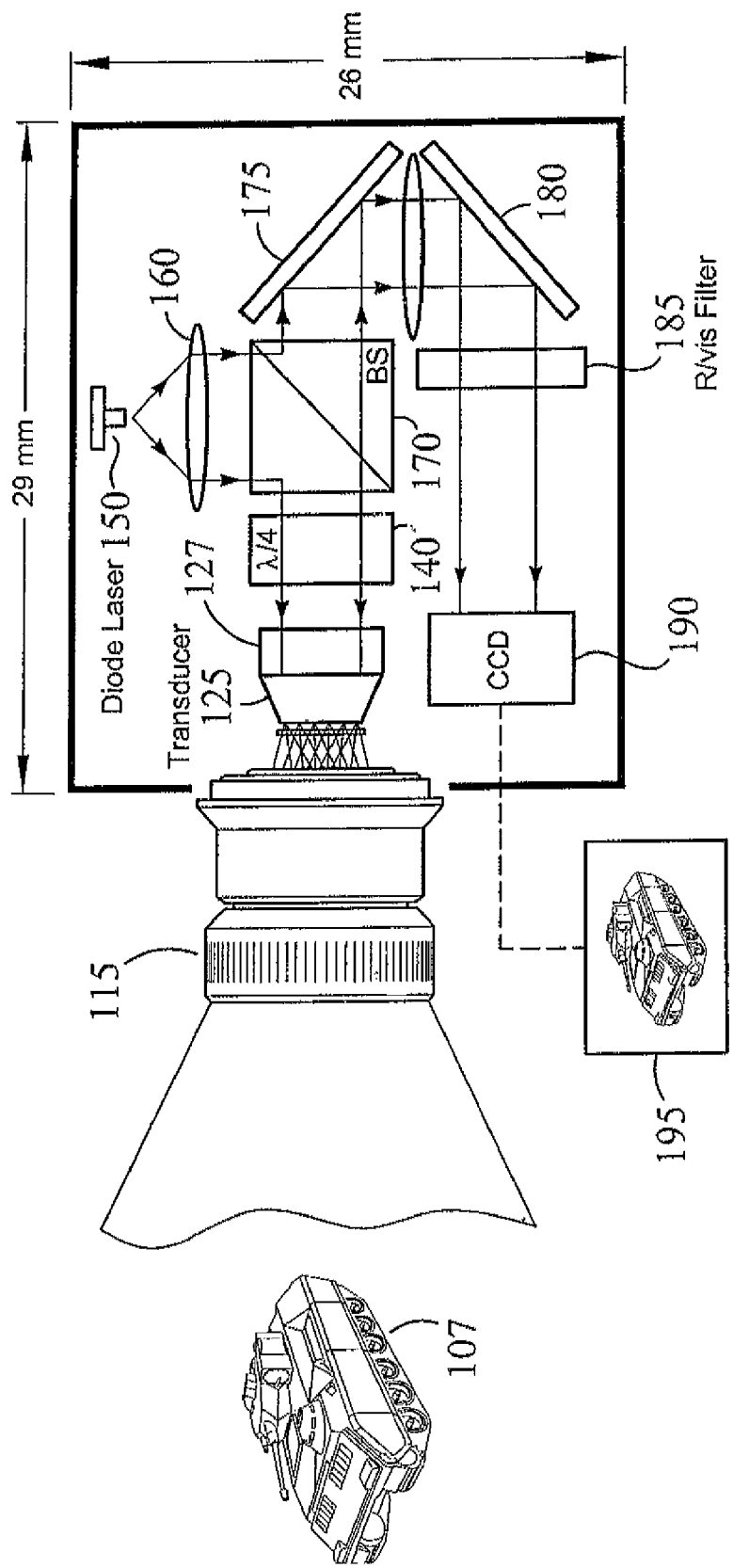
FIGS. 3a, 3b and 3c are graphical schematic representations of yet other embodiments of the system of these teachings.
Figure 3B:
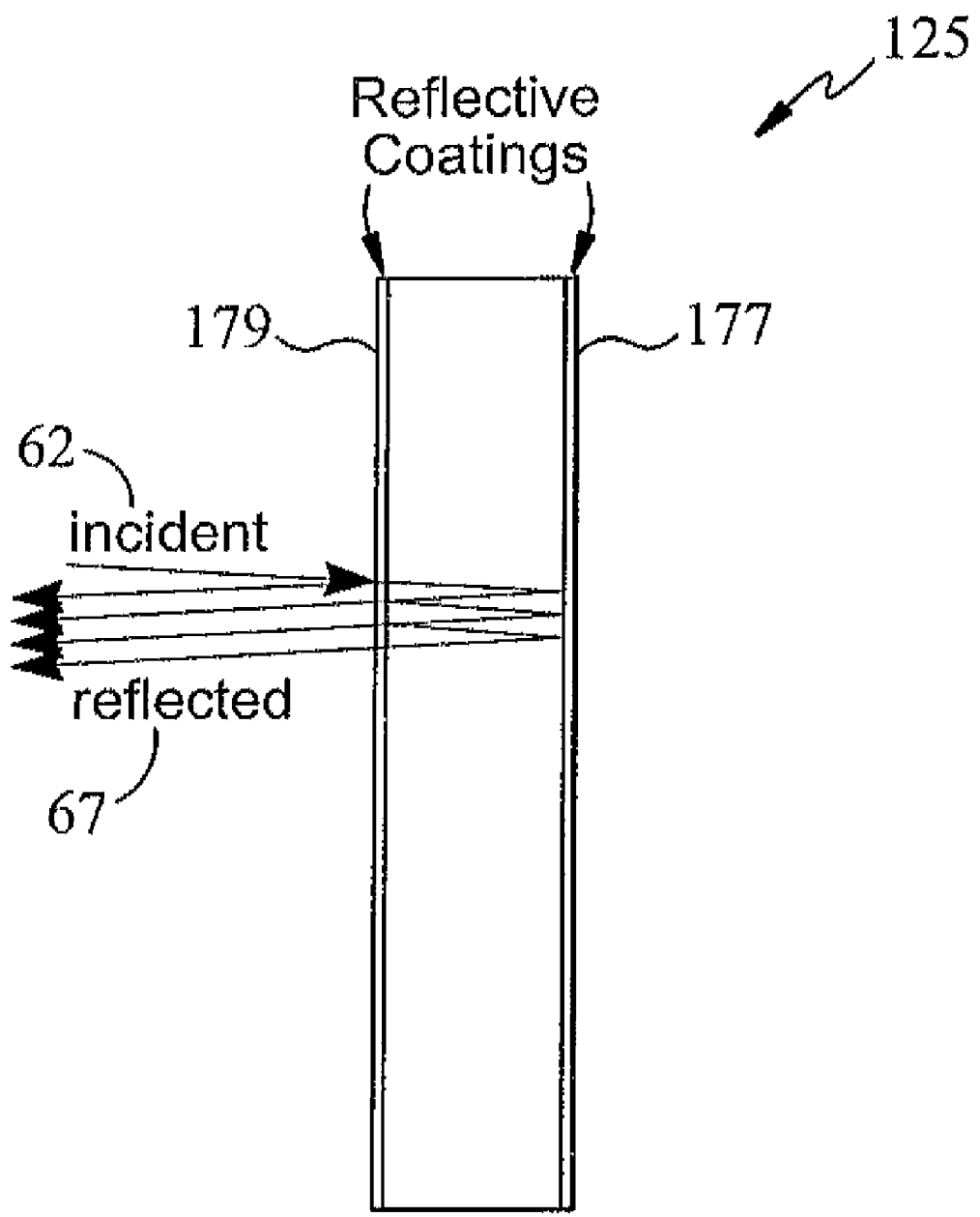

Other embodiments of the image acquisition system of these teachings are shown in FIGS. 2 and 3a and 3b, where elements common to several figures are identified by the same number in each figure. Referring to FIG. 2, in the embodiment shown therein, the image is obtained by performing spatially resolved ellipsometry. A 45° linearly polarized light that undergoes TIR is utilized. The reflected light is elliptically polarized as the s and p-polarized components undergo different phase shifts. A fixed waveplate (140, FIG. 3a) can be inserted so as to make the emerging light either circularly polarized or 45° polarized. Then, an analyzer (70, FIG. 1) is inserted with its polarizing axis either along the p or s polarization so as to produce an image with 50% transmitted light. Thus, when there is no illumination by IR (infrared-the first range of frequencies) radiation, the image acquisition device will produce a uniform image. Any local changes in the thin film stacks will lead to a variation in the intensity received by the camera because of the local change in the state of the polarization caused by the heated film. Referring to FIG. 2, a $CO_2$ laser (10.6 μm) is utilized to heat the surface of the thin film stack 40. In order to observe the phase change, the thin film stack 40 was placed in one of the arms of the Michelson interferometer (including optical elements 105 and 110) operating at He:Ne laser 90 with a wavelength of about 633 nm. The electromagnetic radiation on the He:Ne laser 90 is split by the beam splitter 105 into two beams, one that travels towards a mirror 110 and another one that travels towards the optical transducer 55. A portion of the beam reflected from the mirror 110 is transmitted by the beam splitter 105 and interferes with a portion of the other beam reflected from the optical transducer 55 when the portion of the other beam reflected from the optical transducer is deflected by the beam splitter 105.

Referring to FIG. 3a and FIG. 3b, an input source 107 of electromagnetic radiation in a first range of wavelengths (IR) is imaged by an optical system 115 onto a transducer 127 comprising a film coated with two stacks of reflective coatings, one on each of its two surfaces. The optical thickness of the transducer 127 is altered by heating due to absorbed IR radiation. Specifically, the physical thickness of the film and the refractive index of the film are altered by the heating, as is the physical thicknesses and refractive indices of the reflective coating layers. Another source, diode laser 60, of electromagnetic radiation in a second range of wavelengths (visible) is imaged onto the film stack/transducer 125, through the optical support 127, which supports the transducer 125, by another optical system including optical element 160, beam splitter 170, waveplate 140 and mirrors 175 and 180. (The other optical system can also include filter 185, which transmits the electromagnetic radiation in the second range of wavelengths, but blocks electromagnetic radiation outside the second range of wavelengths.) The system, shown in FIG. 3b, consisting of the film and its two reflective coatings 177, 179 comprise a Fabry-Perot interferometer for electromagnetic radiation in the second range of wavelengths. (The incident 62 and reflected 67 electromagnetic radiation in the second range of wavelengths are also shown in FIG. 3b) The altered optical thickness of the transducer 125 in turn alters the phase difference between electromagnetic radiation in the second range of wavelengths reflected from the two reflective coatings of the transducer 125. In one embodiment, the electromagnetic radiation in the second wavelength range emanating from the diode is linearly polarized, such that the polarization beamsplitter 170 and quarter-wave plate λ/4, 140, allow the electromagnetic radiation in the second range of wavelengths to be conveniently reflected onto the transducer, and the electromagnetic radiation in the second range of wavelengths reflected back by the transducer, after traversing the quarter-wave plate 140 a second time, has its polarization rotated and is efficiently transmitted by the polarization beamsplitter, rather than being reflected back into the diode laser. The other optical system serves as an interferometer and images the interfering portions of the reflected beams (one beam being reflected from each of the two surface reflective coatings) onto a detector 190 (a CCD in the embodiment shown in FIG. 3a). Referring again to FIG. 3a, the analysis component 195 receives data from the detector 190 and obtains intensity information from the interference pattern. In one embodiment, the analysis component 195 is capable of obtaining the phase (fringe) deviations and of obtaining the intensity from the phase (fringe) deviations. The relationship between intensity (or equivalently, the power incident on the pixelated optical transducer) and the change in phase is obtained from calibration or calculation of the optical transducer.

Figure 7:
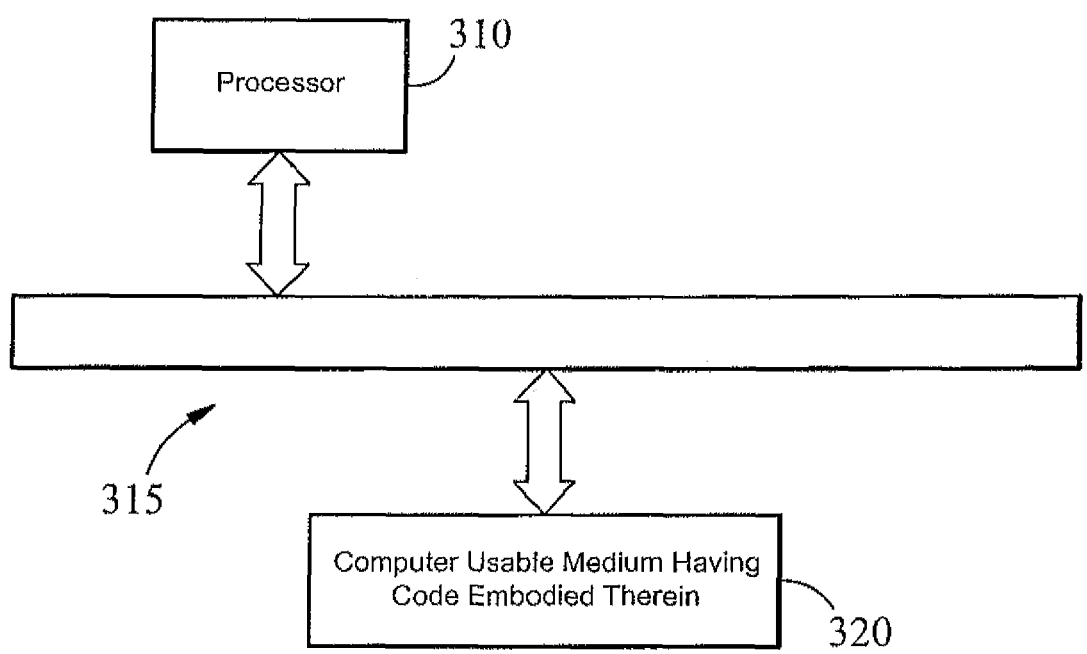
FIG. 7 depicts an embodiment of a further component of the system of these teachings.

In one embodiment, the analysis component includes one or more processors (310, FIG. 7) and a computer usable medium (320, FIG. 7) having computer readable code embodied therein, the computer readable code being capable of causing the one or more processors to obtain an intensity value at each pixel from the change in phase at that pixel. In one embodiment, the computer readable code is also capable of causing the one or more processors to obtain the change in phase from the interference pattern imaged onto the detector. (In FIG. 7, the one or more processors 310 and the computer usable medium 320 are operatively connected by means of a connection component 315 (the connection component may be, for example, a computer bus, or a carrier wave).)

In one embodiment, in order to obtain an image from the heating produced by absorbing the electromagnetic radiation in the first range of wavelengths (from the $CO_2$ laser in FIG. 2), the fringe deviation can be computed from the digitized output of the detector (190 in FIG. 3a).

In one embodiment, the detector 190 is a CCD detector. In another embodiment, the detector 190 is a CMOS detector. In one instance, some or all of the signal processing functions of the analysis component are obtained from components embedded in (integrated into) the same chip as the CMOS detector. The use of the CMOS detector contributes to the reduction in required power resulting in substantially low required power. In another instance, the optical system and the pixelated optical transducer are capable of providing an image for visual observation.

A direct method, included in the method of these teachings, for visualization of the phase is described below. Fringes produced by the Michelson interferometer, as in FIGS. 1 and 2, can be represented as $$f(x,y)=A(x,y)\{1+\cos[k_y y+\phi(x,y)]\}$$

assuming substantial contrast. A(x, y) is a slowly varying background and $\phi(x, y)$ is the spatially dependent phase shift due to heating of the thin films. The above equation can be used to directly measure $\phi(x, y)$. Computer algorithms exist that are capable of measuring the phase of a temporally modulated laser beam to a precision of 1 millidegree. Similar techniques can be applied to the detector output.

However, an approximation to $\phi(x, y)$ can be generated by inserting a sinusoidal mask in front of the acquisition device, between the source of the electromagnetic radiation in the first range of wavelengths that illuminates the surface of the pixelated optical transducer and that surface of the pixelated optical transducer. If the sinusoidal mask has the same spatial frequency as the interferometer fringes, i.e., $$m(x,y)=1+\cos[k_y y]$$

then, the intensity at the detector is given by, $$I(x,y)=f(x,y)m(x,y)$$

$$I(x,y)=A(x,y)\{1+\cos[k_y y+\phi(x,y)]+\cos[k_y y]+\cos[k_y y]\cos[k_y y+\phi(x,y)]\}$$

The last term in the expression can be simplified using trigonometry.

A low frequency term proportional to the cosine of the phase is generated in the recorded image. If the output of the detector is spatially low-pass filtered, all terms oscillating at the higher spatial frequencies of $k_y$ and $2k_y$ will average to zero.

Embodiments of the acquisition system of these teachings with increased sensitivity can be obtained by utilizing optical transducers 40 with increased changes in phase, $\phi$, with changes in the optical thickness induced by the heating from the electromagnetic radiation in the first range of wavelengths (infrared radiation). For example, increasing the reflectivity of the coatings in the embodiment shown in FIGS. 3a and 3b increases the sensitivity to thickness changes in the absorbing film by increasing the finesse of the Fabry-Perot interferometer.

In the embodiments in which the film stacks are thin (with a thickness of a few 100 nm at most), diffusion across and through the surface of the stack occurs on a substantially short timescale. For example, in glass with a diffusivity D=0.01 cm$^2$ s$^{-1}$, the timescale for diffusing 50 µm (typical pixel size) is approximately 2.5 ms while the timescale for diffusing to the substrate (10 µm) is only 100 µs. Thus, the heat absorbed from the incident radiation is retained in the coatings for a very short time. The temperature rise can be estimated or calculated by conventional means. In one instance, by using coatings with low thermal conductivity to separate the substrate from the region of absorption, effective diffusion to the substrate can be made slow compared to the lateral diffusion responsible for blurring of the image. In another instance, coatings are made of different materials and are analyzed using methods of finite element analysis. Lateral diffusion of heat across the image can also be prevented by pixellating the surface and preventing thermal diffusion between pixels.

Figure 4A:
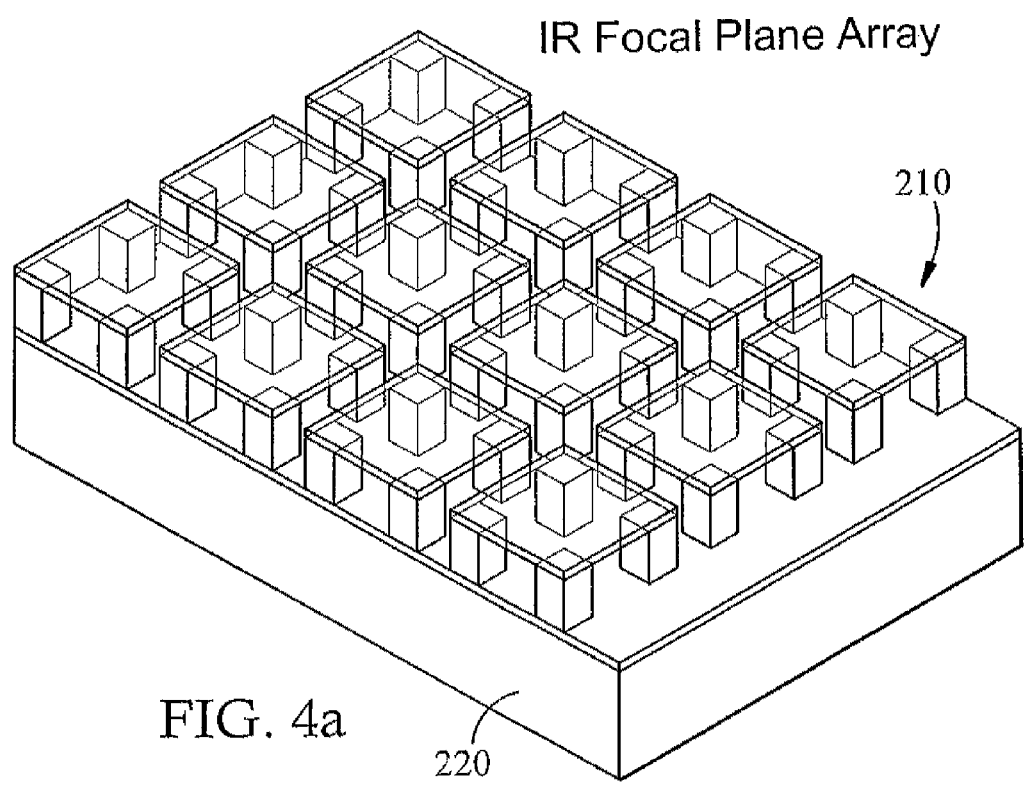
FIGS. 4a and 4b depict embodiments of a component of the system of these teachings.
Figure 4B:
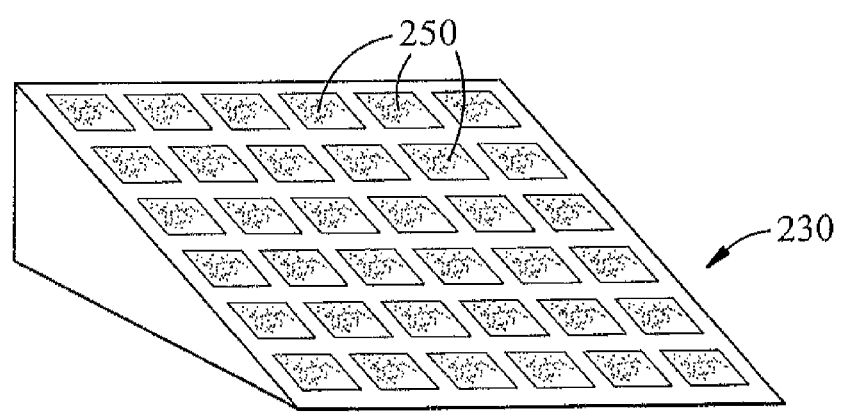

Embodiments of the pixelated optical transducers of these teachings are shown in FIGS. 4a and 4b. Referring to FIGS. 4a and 4b, the pixelated optical transducer of these teachings includes one or more pixelated thin-film layers, also referred to as a thin film stack, (210, FIG. 4a; 230, FIG. 4b) disposed on a support (220, FIG. 4a; 240, FIG. 4b). Each pixel 250 in the pixelated optical transducer is substantially isolated from each other pixel 250.

In one embodiment, the pixel size depends on the lateral diffusion of heat as described herein above. Diffusion of heat can blur the image. In one embodiment of the optical transducer of these teachings, lithographic techniques are utilized to etch the surface to create pixels (islands) that are isolated from each other except through the substrate. In one embodiment, these teachings not be limited to that embodiment, the pixels are about 20-200 µm in characteristic dimension. Note that the change in the substrate temperature has no significant effect on the reflected phase. In one instance, the gap between the pixels (islands) is filled with a low thermal conductivity material.

In one embodiment of the optical transducer of these teachings, a uniaxial crystal is utilized as a substrate (support). Calcite has large differences in its two refractive indices. Coatings on a calcite prism with its optic axis either perpendicular to, or in plane of, the base of the prism may increase sensitivity.

In another embodiment, as shown in FIG. 4a, the support is a honeycomb support. The honeycomb support enables 3-axis substantially high-G loading.

In one instance, one or more materials used for the heat absorbing layer(s) in the optical transducer are polymers. Since polymers are not crystalline, there are substantially no metastable states and, therefore, there is substantially no image retention. The lack of presence of metastable state also results in lack of susceptibility to blinding by bright beams of input radiation in the first range of wavelengths.

Embodiments of methods for fabricating transducer structures for these teachings and other embodiments of transducers are disclosed in U.S. Pat. No. 7,679,042 by Allen M. Flusberg et al., which is incorporated by reference in its entirety.

In one embodiment, as shown in FIG. 5, the electromagnetic radiation in the first range of wavelengths is imaged onto a surface 260 of the optical transducer (125, FIG. 3) by an optical system (270, FIG. 5; 125, FIG. 3) and the surface is a curved surface. A shape of the curved surface substantially coincides with a predetermined shape, the predetermined shape being selected to substantially compensate for aberrations of the optical system (270, FIG. 5; 125, FIG. 3).

In one embodiment, the thin film stack comprises a number of layers of alternating high and low refractive index material. Calculations indicate that a stack comprised of the two groups of layers, as shown in FIG. 6a, where each group has an optical thickness of approximately 0.6 wave produces rapid variation in the phase when the optical path changes. (Absorption of electromagnetic radiation can cause the optical path to change.) FIG. 6b shows a plot of the phase change produced for each polarization as the stack expands or contracts to provide an effective change in the optical thickness. Note that a phase shift of one wave can be achieved for approximately a 1% change in the optical thickness of the individual materials in the stack.

In one embodiment, the TIR (support) surface is coated with a material of substantially high reflectivity at first group of wavelengths (such as, but not limited to, infrared) followed by layers of material that absorb radiation at the first group of wavelengths (such as, but not limited to, IR). Due to the presence of the layer of material was substantially higher productivity, absorption of the radiation is increased while eliminating radiative heating of the substrate (support).

Embodiments of the thin film stack that use materials with low specific heat, large change in optical length, and, with temperature and large absorption in the first range of wavelengths (such as, but not limited to, IR) are within the scope of these teachings.

Figure 8A:
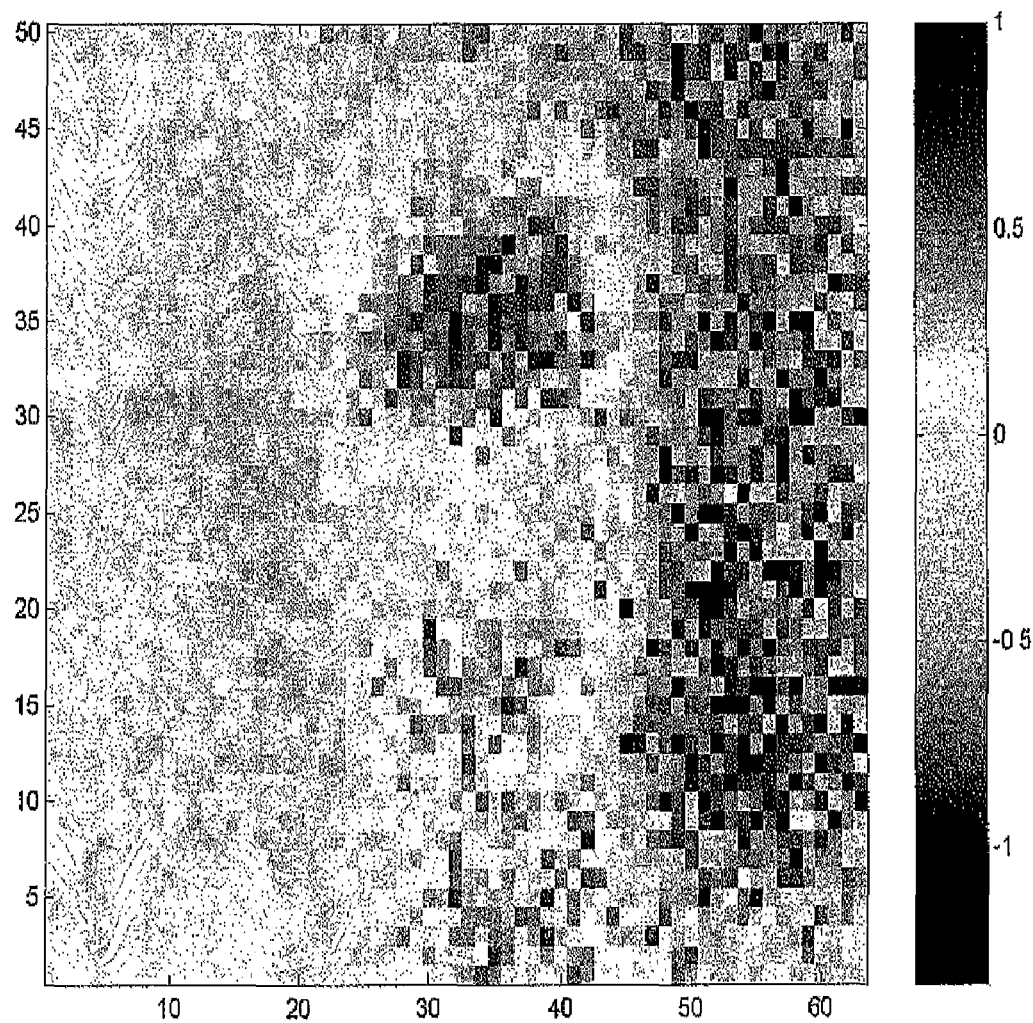
FIG. 8a represents results from an embodiment of the system of these teachings.
Figure 8B:
FIG. 8b represents results from a conventional system.

In order to illustrate the use of the embodiments of these teachings described hereinabove, results from an embodiment of the system of these teachings are shown in FIG. 8a. FIG. 8b illustrates a visible image, for comparison, of the same subject taken with a conventional image acquisition device. The optical transducer used comprised nitrocellulose film with low-finesse coating (pellicle). The system utilized a Fabry-Perot interferometer.

Figure 3C:
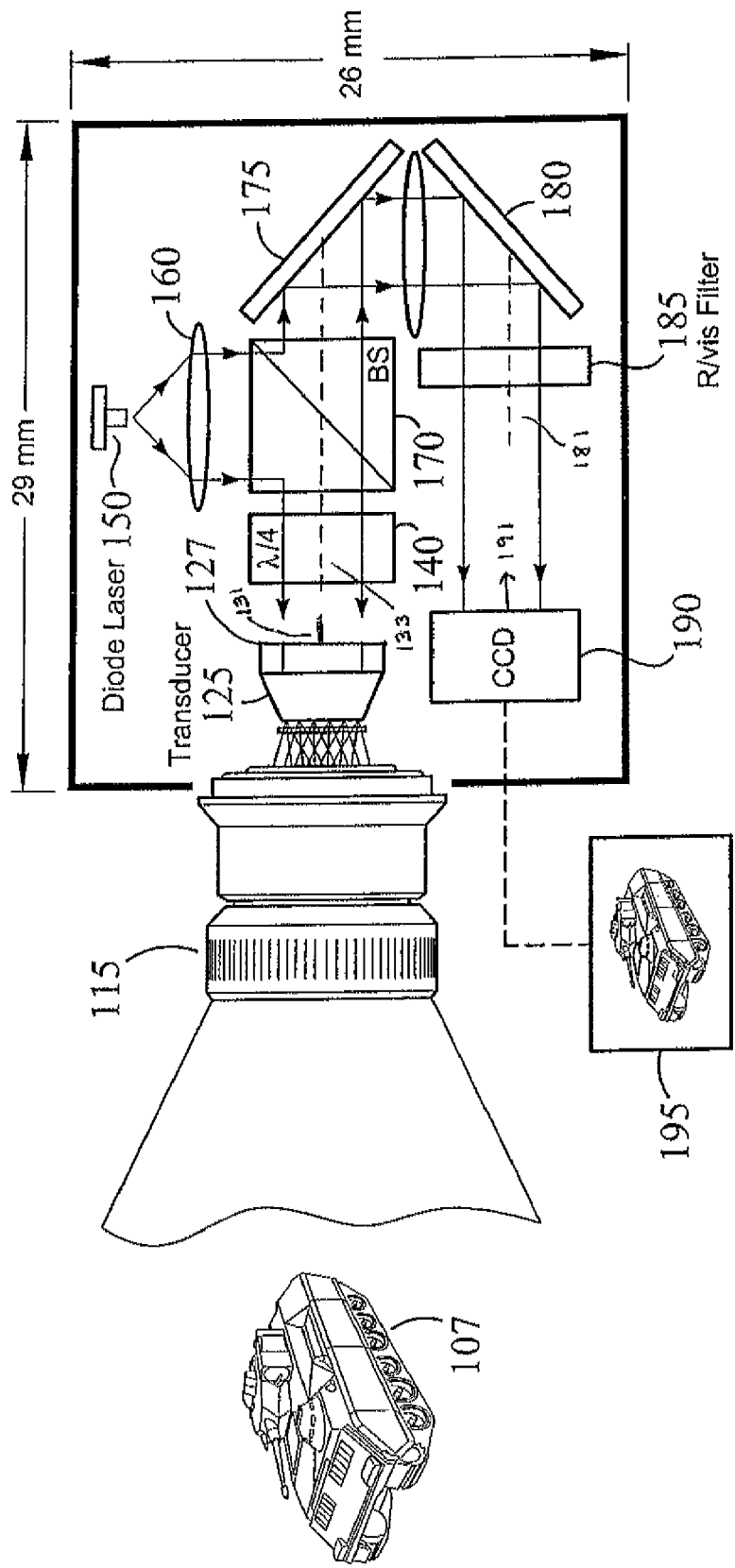

In one embodiment of the system of these teachings, such as that shown in FIG. 3c, although not being limited only to the system shown in FIG. 3c, a normal 131 (a perpendicular to the surface of the transducer 127 that faces the optical system comprised of the waveplate 140, the beam splitter 170 and the reflector 175) to the transducer 125, 127 is inclined with respect to an optical axis 133 of the optical system comprised of the waveplate 140, the beam splitter 170 and the reflector 175. (This is common referred to as the transducer is being tilted respect to the optical axis. Again it should be noted that FIG. 3c is used as an exemplary embodiment, a variety of other embodiments are within the scope of these teachings in which the transducer is tilted with respect to the optical axis of the optical system receiving the electromagnetic radiation from the transducer.)

In another embodiment, the detector 190 is also tilted with respect to an optical axis 181. In the embodiment shown the optical axis is another optical axis 181; this is not a limitation of these teachings. Embodiments in which the other optical axis 181 is the same as the optical axis 133 are within the scope of these teachings. The tilt (the angle between a normal 191 and the other optical axis 181) of the transducer and the tilt of the detector can be chosen to compensate for the depth of focus. In such embodiments, the analysis component can be used to eliminate image artifacts that may arise (although they do not need to arise) from posts such as those shown in FIG. 4a.

While not desiring to be bound by theory, the following explanation describes the effects of tilting at least one surface 127 of the transducer 125 and/or the detector 191. The optical thickness of the transducer pixels changes with temperature. As a result, the reflectivity at a given angle of incidence of the electromagnetic radiation in the second range of wavelengths is a function of temperature. At any temperature, however, the reflectivity is also a function of angle. There is a substantially optimum reflectivity that substantially maximizes the signal-to-noise ratio. If the temperature of the transducer 125 changes substantially uniformly (the same for all pixels the angle of incidence of the electromagnetic radiation in the second range of wavelengths can be selected to maintain the reflectivity at the substantially optimum value. In one instance, the angle of incidence is varied by tilting at least one surface 127 of the transducer 125. Because the transducer 125 is imaged onto the detector 190 (CMOS or CCD array in one embodiment, not a limitation of these teachings) by the optical system that conveys the reflected electromagnetic radiation in the second range of wavelengths from the transducer to the detector, the detector 190 (in one embodiment, a CMOS or CCD array) does not have to be displaced to capture the image, even though tilting the transducer modifies the path taken by the reflected electromagnetic radiation in the second range of wavelengths through the optical system. That is, the imaging substantially guarantees that substantially no such displacement occurs, hence the detector 190 can be stationary. In some embodiments, the detector 190 is tilted to maintain high, resolution of the image.

Note that the reflectivity at a given angle of incidence and optical thickness of the transducer is also a function of the wavelength of the electromagnetic radiation in the second range of wavelengths, which hereinabove was considered fixed. Therefore, in another embodiment, the reflectivity is substantially maintained at the substantially optimum value by tuning the wavelength of the source of electromagnetic radiation 150 in the second range of wavelengths.

Figure 9A:
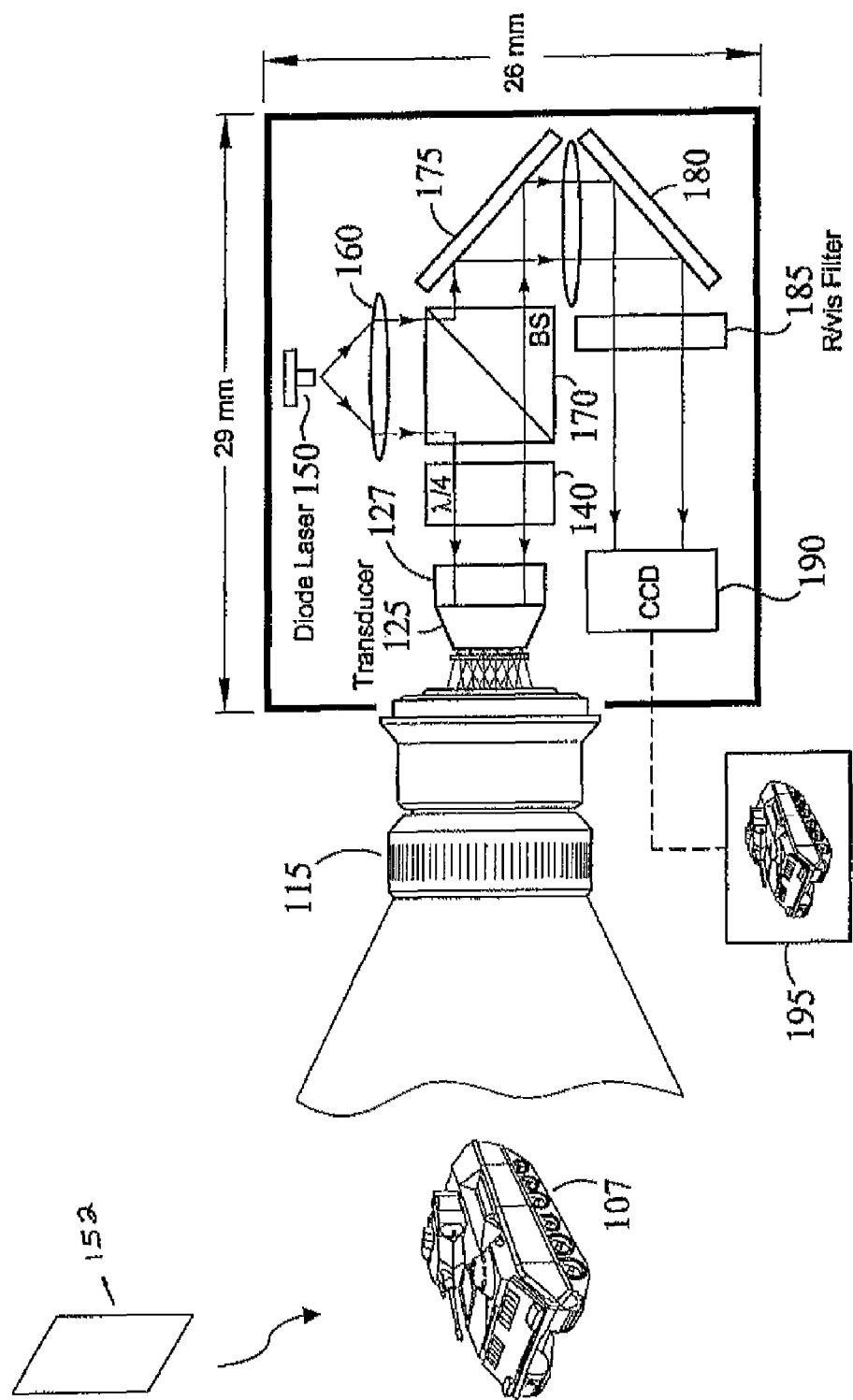
FIGS. 9a, 9b are graphical schematic representations of a further embodiment of the system of these teachings.
Figure 9B:
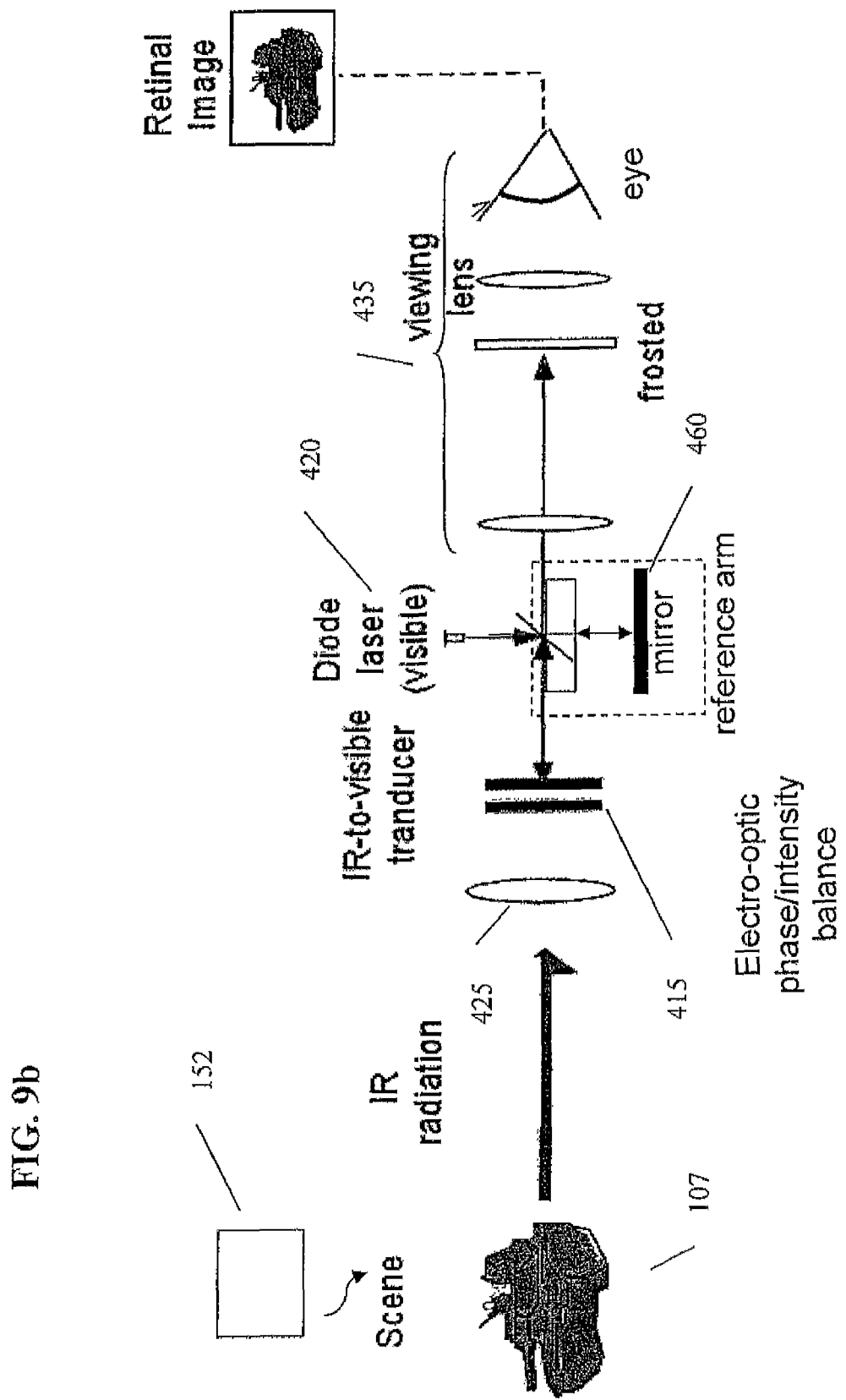

In the embodiment shown in FIGS. 9a and 9b, an external source 152 of electromagnetic radiation emitting in the first range of wavelengths (IR for example) illuminates the input region. The electromagnetic radiation in the first range of wavelengths (IR for example) emanates and/or is reflected from the input region or input object 107. In one instance, these teachings not being limited to only that instance, the external source of electromagnetic radiation is a laser, such as, but not limited to, a CO2 laser. The laser acts as a floodlight illuminating the input region.

Figure 11A:
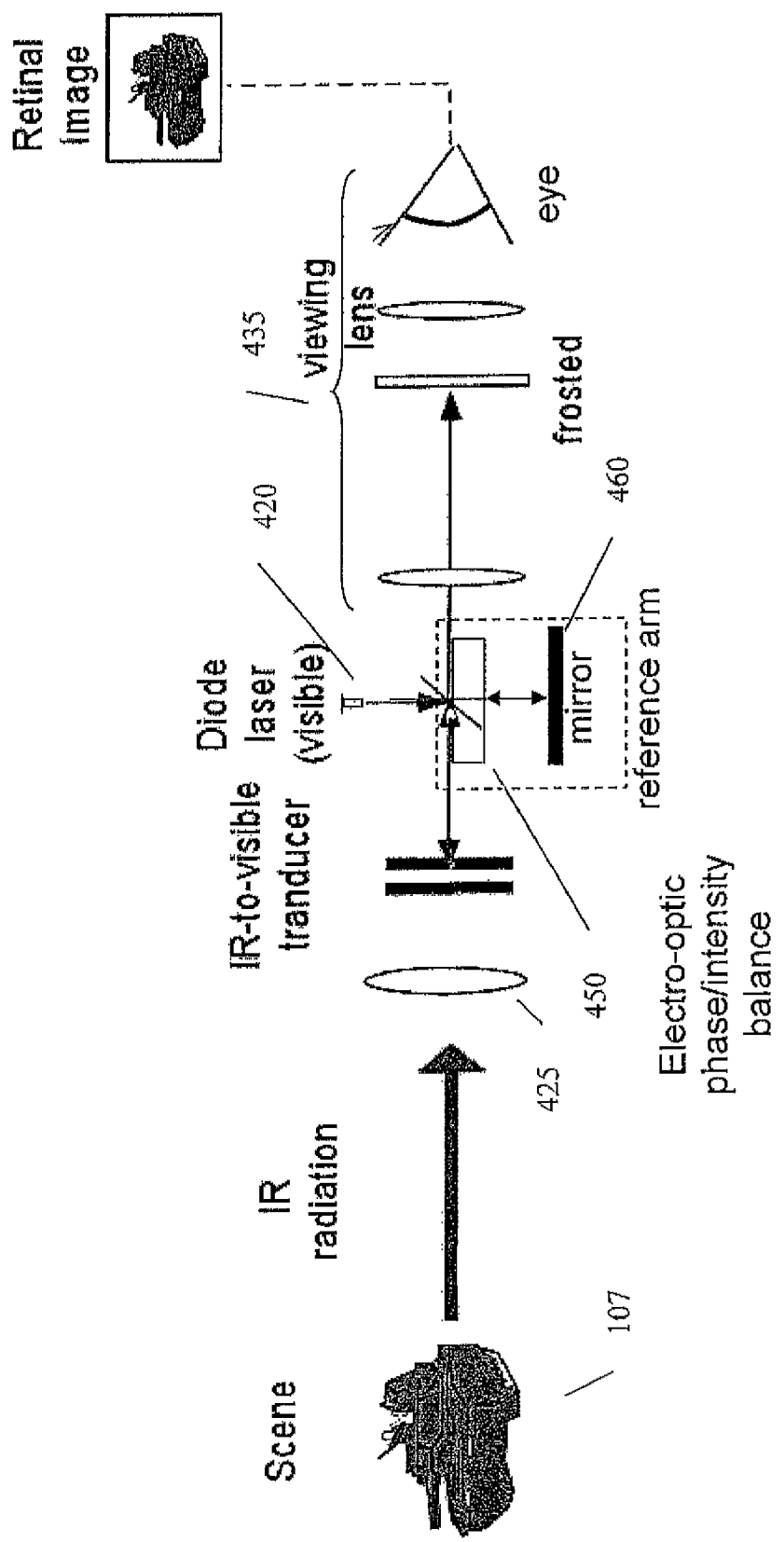
FIGS. 11a and 11b are graphical schematic representations of still a further embodiment of the system of these teachings.

FIGS. 10a, 10b, 11a depict another embodiment of the system of these teachings in which the optical system 410, 430 (435 in FIG. 11a) and the transducer 415 are capable of providing an image for visual observation. Referring to FIGS. 10a, 10b, 11a, another optical system 425 images the electromagnetic radiation in the first range of wavelengths (the IR range in one embodiment, not a limitation of these teachings) onto the transducer 415. Electromagnetic radiation from a source 420 of electromagnetic radiation in the second range of wavelengths impinges on the back surfers of the transducer 415. In the embodiment shown in FIG. 10a, the second range of wavelengths is in the visible range, permitting direct visualization.

Figure 11B:
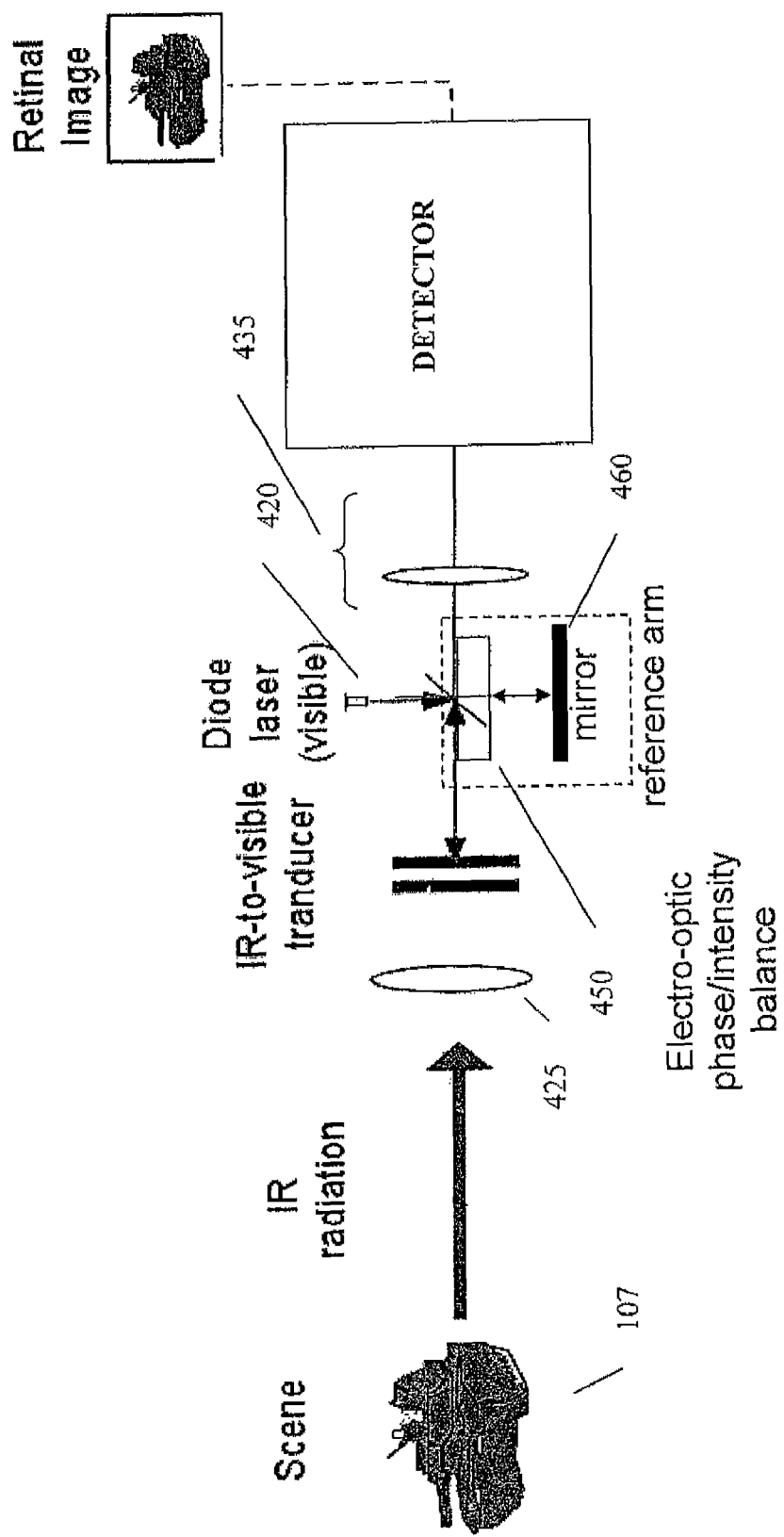

Referring to FIGS. 11a and 11b, the embodiment shown therein includes an adjustable optical component 450 capable of being adjusted to determine phase/intensity of a reference section (reference arm). The adjustable optical component 450 receives a portion of the electromagnetic radiation in the second range of wavelengths emanating from the source of electromagnetic radiation in the second range of wavelengths (the visible range, for example). A reflecting optical component 460 (a mirror for example) is disposed to receive the electromagnetic radiation transmitted through the adjustable optical component. The adjustable optical component 450 is disposed between the optical system and the reflecting optical component. In one embodiment, the reference and phase/intensity is adjusted by the adjustable optical component 450 in order to obtain substantially high contrast for the visually observed image. In one instance, the adjustable optical component can include an electro-optic component. In another instance, a translatable mirror is utilized to change the optical path length thereby adjusting the phase. In yet another instance, attenuators are placed in the path of the electromagnetic radiation in order to adjust the intensity. Embodiments utilizing a combination of at least some electro-optic components, translatable mirrors and attenuators are also within the scope of these teachings. In the embodiment shown, the transducer is a pixelated optical transducer.

Referring again to FIGS. 11a and 11b, in the system shown therein, a source 107 of electromagnetic radiation in a first range of wavelengths provides electromagnetic radiation in the first range of wavelengths that is received by an optical system 425. The optical system 425 images the received electromagnetic radiation onto a pixelated optical transducer 415. The pixelated optical transducer 415 is capable of absorbing some of the received electromagnetic radiation in the first range of wavelengths. Another source 420 provides electromagnetic radiation in a second range of wavelengths. A portion of the electromagnetic radiation in the second range of wavelengths is received by the back surface of the pixelated optical transducer 415. The pixelated optical transducer 415 is capable of causing, when the electromagnetic radiation from the other source 420 interacts with the optical transducer after absorption of a portion of the electromagnetic radiation from the source, a variation in phase of electromagnetic radiation in the second range of wavelengths emanating from the optical transducer. In the embodiment shown in FIGS. 11a and 11b, the transducer receives electromagnetic radiation in the first range of wavelengths at one surface and the electromagnetic radiation in the second range of wavelengths at the other surface. An optical system 435, including a beam splitting component, receives the electromagnetic radiation from the other source 420, provides a portion of the received electromagnetic radiation to the optical transducer, receives the electromagnetic radiation emanating from the optical transducer and provides a portion of the electromagnetic radiation received from the transducer to an adjustable optical component 460. The adjustable optical component reflects a portion of the provided electromagnetic radiation and that portion is returned to the optical subsystem. The optical subsystem 435 also provides electromagnetic radiation in the second range of wavelengths to a detector. The optical subsystem images an interference pattern onto the detector. The interference pattern is obtained from a portion of the electromagnetic radiation emanating from the other source (including that reflected from the adjustable optical component 460) and the portion of the electromagnetic radiation emanating from the optical transducer 415. In the embodiment shown in FIG. 11a, the second range of wavelengths is in the visible range and the detector is visual detection.

Figure 12A:
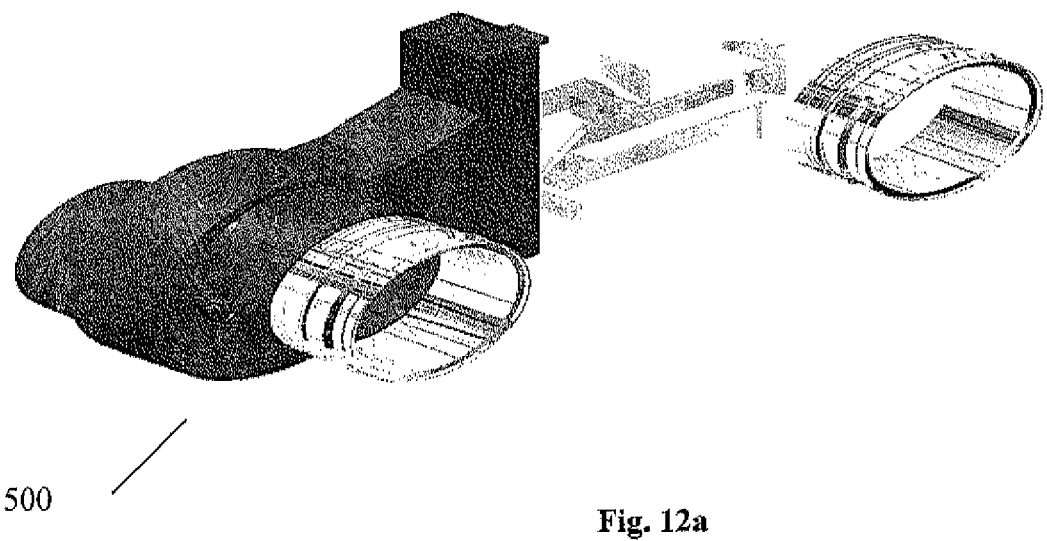
FIGS. 12a, 12b are graphical schematic representations of a system incorporating an embodiment of the system of these teachings.
Figure 12B:
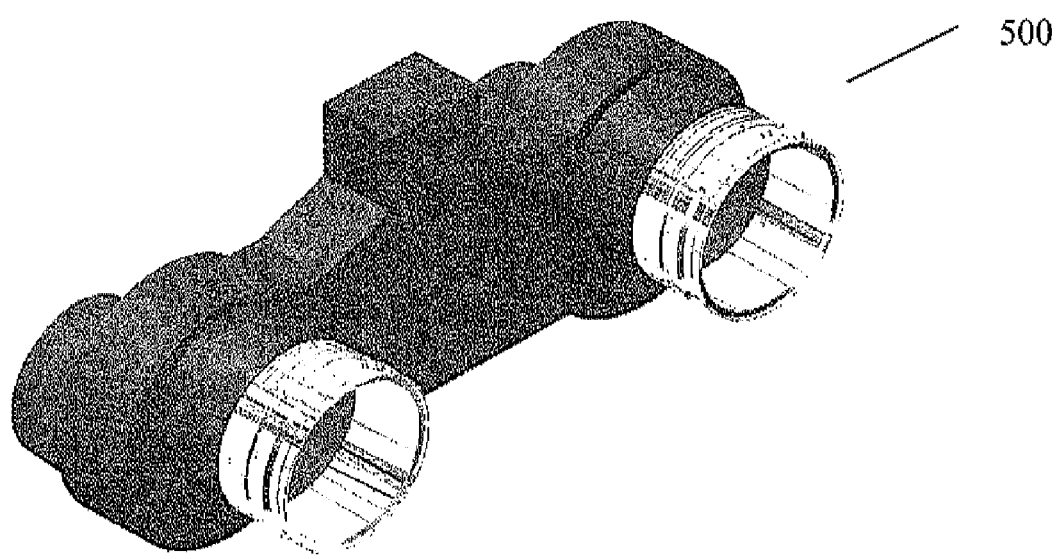

The embodiment of the system of these teachings that are capable of providing an image for visual observation can be incorporated in a number of larger systems. In one instance, the system of these teachings is incorporated into goggles 500 as shown in FIGS. 12a, 12b.

It should be noted that, although the detailed embodiments presented above utilized a Michelson or Fabry-Perot interferometer configuration, other embodiments utilizing other interferometer configurations, such as, but not limited to, Mach-Zehnder or Gires-Tournois, are within the scope of these teachings.

It should be noted that although the above embodiments refer to a first group of wavelengths, that first group of wavelengths can be comprised of several bands of wavelengths. Similarly, the second group of wavelengths can be comprised of several other bands of wavelengths. Utilizing this property, pixel-by-pixel subtraction of the multiple bands can provide enhanced detection capability.

It should be noted that the image acquisition system of these teachings requires substantially no cooling of the detector.

It should be noted that, since the use of the source 60 of electromagnetic radiation in the second range of wavelengths results in substantially small heating of the optical transducer, the image acquisition device of these teachings may not require frequent recalibration.

Although the invention has been described with respect to various embodiments, it should be realized these teachings are also capable of a wide variety of further and other embodiments within the spirit and scope of the appended claims.

What is claimed is:

1. A camera comprising:
a pixelated optical transducer absorbing electromagnetic radiation in a first range of wavelengths; the electromagnetic radiation in the first range of wavelengths being received from an input source of electromagnetic radiation;
another source of electromagnetic radiation in a second range of wavelengths;
said pixelated optical transducer being also causing, when the electromagnetic radiation from said another source interacts with said pixelated optical transducer after absorption of a portion of electromagnetic radiation from the input source, a variation in phase of electromagnetic radiation in the second range of wavelengths emanating from the optical transducer; each pixel in said pixelated optical transducer being substantially thermally isolated from each other pixel in said pixelated optical transducer;
said pixelated optical transducer receiving electromagnetic radiation in the first range of wavelengths at least one surface and of receiving electromagnetic radiation in the second range of wavelengths at least another surface;
said pixelated optical transducer comprising at least one layer of material capable of absorbing the portion of electromagnetic radiation from the input source; said at least one layer of material being disposed on a support; said support being capable of allowing transmission of electromagnetic radiation in the second range of wavelengths; alteration in optical thickness of said at least one layer of material resulting from absorbing the portion of electromagnetic radiation from the input source; an image being obtained from alteration in optical thickness of said at least one layer of material, said alteration resulting from absorbing the portion of electromagnetic radiation from the input source;
an optical system receiving electromagnetic radiation emanating from said another source, providing a portion of the received electromagnetic radiation emanating from said another source to said optical transducer, and receiving a portion of the electromagnetic radiation in the second range of wavelengths emanating from the optical transducer; and
means for detecting electromagnetic radiation;
said optical system also imaging an interference pattern onto said detecting means; the interference pattern being obtained from a portion of the electromagnetic radiation emanating from said another source and the portion of the electromagnetic radiation in the second range of wavelengths emanating from the optical transducer.

2. The camera of claim 1 wherein said detecting means is a detector.

3. The camera of claim 2 wherein said detector is a CMOS detector.

4. The camera of claim 1 further comprising:
an analysis component obtaining intensity information from the interference pattern; and
another optical system imaging the input source of electromagnetic radiation onto said at least one surface of said pixelated optical transducer;
whereby a substantially low power consumption is achieved.

5. The camera of claim 1 further comprising:
an external source of electromagnetic radiation; said external source emitting electromagnetic radiation in a first range of wavelengths; said external source illuminating an input region; electromagnetic radiation in the first range of wavelengths emanating/reflected from the input region and at least a portion of the electromagnetic radiation emitted from the external source comprising the input source of electromagnetic radiation.

6. The camera of claim 1 wherein a line perpendicular to said at least another surface of said pixelated optical transducer is inclined at a predetermined angle with respect to an optical axis of said optical system.

7. The camera of claim 6 wherein said detecting means is a detector.

8. The camera of claim 7 wherein a line perpendicular to a surface of said detector is inclined at another predetermined angle with respect to another optical axis of said optical system.

9. The camera of claim 8 wherein said predetermined angle and said another predetermined angle are selected to satisfy a predetermined criterion.

10. The camera of claim 9 wherein said predetermined criterion is substantial compensation for depth of focus.

11. The camera of claim 9 wherein said predetermined criterion is substantial elimination of image artifacts.

12. The camera of claim 6 further comprising:
an analysis component obtaining intensity information from the interference pattern;
whereby the obtained intensity information provides an image of the input source.

13. The camera of claim 1 wherein said detecting means comprise visual detection; and wherein said second range of wavelengths is a range of visible wavelengths.

14. The camera of claim 13 further comprising:
an external source of electromagnetic radiation; said external source emitting electromagnetic radiation in a first range of wavelengths; said external source illuminating an input region;
electromagnetic radiation in the first range of wavelengths emanating/reflected from the input region and at least a portion of the electromagnetic radiation emitted from the external source comprising the input source of electromagnetic radiation.

15. A camera comprising:
a pixelated optical transducer absorbing electromagnetic radiation in a first range of wavelengths; the electromagnetic radiation in the first range of wavelengths being received from an input source of electromagnetic radiation;
another source of electromagnetic radiation in a second range of wavelengths;
said pixelated optical transducer being also causing, when the electromagnetic radiation from said another source interacts with said pixelated optical transducer after absorption of a portion of electromagnetic radiation from the input source, a variation in phase of electromagnetic radiation in the second range of wavelengths emanating from the optical transducer;
said pixelated optical transducer receiving electromagnetic radiation in the first range of wavelengths at least one surface and of receiving electromagnetic radiation in the second range of wavelengths at least another surface;
an optical system receiving electromagnetic radiation emanating from said another source, providing a portion of the received electromagnetic radiation emanating from said another source to said optical transducer, and receiving a portion of the electromagnetic radiation in the second range of wavelengths emanating from the optical transducer;
means for detecting electromagnetic radiation;
said optical system also imaging an interference pattern onto said detecting means; the interference pattern being obtained from a portion of the electromagnetic radiation emanating from said another source and the portion of the electromagnetic radiation in the second range of wavelengths emanating from the optical transducer; and
an adjustable optical component being adjusted to determine phase/intensity transmitted for electromagnetic radiation in the second range of wavelengths;
said adjustable optical component being disposed to receive said another portion of the electromagnetic radiation emanating from said another source; said adjustable optical component reflecting a portion of the electromagnetic radiation received by said adjustable optical component.

16. The camera of claim 15 wherein said detecting means is a detector.

17. The camera of claim 15 wherein said second range of wavelengths is a range of visible wavelengths; and wherein said detecting means comprise visual detection.

18. A camera comprising:
a pixelated optical transducer absorbing electromagnetic radiation in a first range of wavelengths; the electromagnetic radiation in the first range of wavelengths being received from an input source of electromagnetic radiation;
another source of electromagnetic radiation in a second range of wavelengths;
said pixelated optical transducer being also causing, when the electromagnetic radiation from said another source interacts with said pixelated optical transducer after absorption of a portion of electromagnetic radiation from the input source, a variation in phase of electromagnetic radiation in the second range of wavelengths emanating from the optical transducer;
said pixelated optical transducer receiving electromagnetic radiation in the first range of wavelengths at least one surface and of receiving electromagnetic radiation in the second range of wavelengths at least another surface;
an optical system receiving electromagnetic radiation emanating from said another source providing a portion of the received electromagnetic radiation emanating from said another source to said optical transducer, and receiving a portion of the electromagnetic radiation in the second range of wavelengths emanating from the optical transducer;
means for detecting electromagnetic radiation;
said optical system also imaging an interference pattern onto said detecting means; the interference pattern being obtained from a portion of the electromagnetic radiation emanating from said another source and the portion of the electromagnetic radiation in the second range of wavelengths emanating from the optical transducer;
said detecting means comprising visual detection; said second range of wavelengths being a range of visible wavelengths; and
an adjustable optical component being adjusted to determine phase/intensity transmitted for electromagnetic radiation in the second range of wavelengths;
said adjustable optical component being disposed to receive said another portion of the electromagnetic radiation emanating from said another source; said adjustable optical component reflecting a portion of the electromagnetic radiation received by said adjustable optical component;
said optical system, said adjustable optical component and said pixelated optical transducer providing an image for visual observation; said image being generated by providing a corresponding relationship between at least some sub-ranges from said first range of wavelengths and at least some other sub-ranges from said range of visible wavelengths.

* * * * *